United States Patent [19]
Akita

[11] Patent Number: 5,502,712
[45] Date of Patent: Mar. 26, 1996

[54] ROUTING SYSTEM IN DATA COMMUNICATION WITH FRAME RELAY PROCEDURE CONTROL

[75] Inventor: Kunihiko Akita, Tokyo, Japan

[73] Assignee: NEC Corporation, Japan

[21] Appl. No.: 330,254

[22] Filed: Oct. 27, 1994

[30] Foreign Application Priority Data

Oct. 29, 1993 [JP] Japan .................................. 5-292551

[51] Int. Cl.⁶ .................................................. H04L 12/24
[52] U.S. Cl. ..................... 370/16; 370/58.2; 370/85.13; 370/94.2; 340/827; 340/825.16; 379/221
[58] Field of Search .................................. 370/16, 54, 13, 370/14, 17, 53, 54, 56, 58.1, 58.2, 85.13, 60, 94.1, 94.2; 379/2, 221, 273, 219, 220, 229, 272, 22, 26; 340/827, 825.03, 825.06, 825.16, 825.17, 826; 371/11.1, 11.2, 11.3

[56] References Cited

U.S. PATENT DOCUMENTS

| | | | |
|---|---|---|---|
| 4,466,060 | 8/1984 | Riddle ........................................ | 370/16 |
| 4,890,224 | 12/1989 | Fremont .................................... | 370/16 |
| 5,259,027 | 11/1993 | Winter et al. ............................ | 370/16 |
| 5,347,271 | 9/1994 | Iwasaki .................................... | 370/16 |

FOREIGN PATENT DOCUMENTS 2-13139  1/1990  Japan.

Primary Examiner—Alpus Hsu
Assistant Examiner—Ricky Q. Ngo
Attorney, Agent, or Firm—Ostrolenk, Faber, Gerb & Soffen

[57] ABSTRACT

In a routing system used in each of exchange stations of a data communication network and including trunk terminator groups physically terminating transit trunks to receive incoming signals and send outgoing signals and route selectors for selecting an alternative route, a switch switches the incoming signals into switch output signals and, into the outgoing signals, switch input signals transmitted through the route selectors. Frame relay communication controllers process, into processed signals, the switch output signals conveyed through the route selectors and controlled signals into the switch input signals. A frame relay procedure processor processes the processed signals into relay output signals and relay input signals into the controlled signals and locate a faulty trunk transmitting a fault for superposition on the relay output signals during presence of the fault, to control the switch and to put the route selectors into operation. Connected to the faulty trunk by the switch during presence of the fault, a monitor/controller restores the fault. An input/output device processes the relay output signals into reception data signals and transmission data signals into the relay input signals. Processing the reception data signals into input data signals for X.25 terminals, each communication control section suspends processing of output data signals into the transmission data signals during presence of the fault for retransmission as soon as the fault is restored. At least two trunk control sections may be connected to the input/output device.

10 Claims, 5 Drawing Sheets

ROUTING SYSTEM IN DATA COMMUNICATION WITH FRAME RELAY PROCEDURE CONTROL

BACKGROUND OF THE INVENTION

This invention relates to a routing system for use in a data communication exchange network in selecting an alternative route from a plurality of transit trunks of the network with no interruption and, more particularly, to a routing system for use in a data communication exchange network operable with X.25 protocols.

The data communication exchange network is a data communication network comprising a plurality of exchange or switching stations. The transit trunks connect each station to others of the exchange stations.

In the manner which will later be described in greater detail, each transit trunk provides a group of trunk channels. Each station comprises a group of channel-per-station unit connected to the trunk channel group as a trunk terminator group. The station consequently comprises trunk terminator groups which physically terminate the transit trunks to receive incoming signals from the other exchange stations and to send outgoing signals to the other exchange stations through the tranist trunks. The trunk channels of the transit trunk groups are in one-to-one correspondence to the incoming signals and to the outgoing signals. Each of the incoming and the outgoing signals includes a data call.

When a fault takes place either in one of the trunk channels of the transit trunks or in the exchange station connected to one of the transit trunks, the trunk channel is a faulty channel transmitting the fault by its incapability of transmitting a corresponding one of the incoming signals and a corresponding one of the outgoing signals. Merely for convenience of the description which follows, attention will be directed to the transit trunks, trunk by trunk, rather than to the trunk channels. Including the faulty channel, the transit trunk will therefore be called a faulty trunk.

It is known to detect the fault by monitoring the incoming signals received through the transit trunks, to locate the faulty trunk, and to select an alternative route through the transit trunks which are not faulty but normal trunks. The alternative route is used in place of the faulty trunk in order to continue reception of the incoming signal and transmission of the outgoing signal with no interruption. In the meantime, the fault is restored or recovered to reuse the faulty trunk as a normal trunk.

Various manners of detection of the fault or the faulty trunk and of restoration of the fault are known.

A first of these manners resorts to fault detection/restoration in an open systems interconnection (OSI) layer 1. In accordance with this first manner, the fault is detected add restored by monitoring a carrier signal or a like control signal received from a modem connected to each transit trunk.

A second manner is applied to a data communication network with X.25 protocols used between the network and communication terminals connected to the exchange stations and resorts to fault detection/restoration is an open systems interconnection layer 2. The fault is detected and restored by monitoring a disorder in sequence numbers defined by the layer 2 for retry of transmission, time out of timer control, or an error detected by a flag check sequence (ES).

A third manner is to use a frame relay. That is, the fault is detected and restored by receiving frames which the network automatically generates for delivery to the exchange stations in the incoming signals in order to indicate a state of congestion and/or fault according to the consolidated link layer management (CLLLM) messages defined by the frame relay. The fault is detected and restored furthermore by a local management interface (LMI) to monitor whether or not a link is normal between the network and each user.

The frame relay is a protocol which makes it possible to transmit data at a higher rate than packed-switch exchange. This is rendered possible by processing a core function alone in the layer 2 to detect transmission errors and the like by the flag check sequence between the network and the user terminals and thereby to reduce protocol processing necessary on the side of the network. The timer control and others of the layer 2 and of layers 3 or higher are left to or given in charge of processing between the users.

A fourth manner is to use in fault detection/restoration a status signal indicative of whether or not the transit trunks are normal. This manner is disclosed in Japanese Patent Prepublication (A) No. 13,139 of 1990 in connection with a satellite communication network and a terrestrial communication network.

Various manners are known also as regerds control of the transit trunks during presence of the fault.

A first of these manners will herein be called an A manner. According to the A manner, use is made of a redundancy, namely, a communication network comprising two series, such as No. 0 and No. 1 series, as an active and a standby series. When a fault takes place in the active series, the standby series is used to continue communication with no interruption.

A second of the manners will be called a B manner, wherein a routing table is used to specify it least one additional transit trunk in the communication network comprising either only a single series or two series. When the fault occurs to disable communication, the routing table is referred to for selection of the alternative route through the additional transit trunk or trunks.

A third of the manners will be called a C manner, wherein the routing table is also used. When the fault occurs in whichever of the single series, one of the two series, and one of the transit trunks to give rise to failure of a call, the routing table is used in afresh directing the call to an additional transit trunk as a fresh call and in using the additional transit trunk as the alternative route.

When this C manner is applied to a data communication network wherein X.75 protocols are used as protocols of the transit trunks, each exchange station must comprise an LAPB LSI in supporting the X.75 protocols. Such LSI's are separately used for the normal transit trunks and for the additional transit trunk or trunks.

In the manner described in the foregoing, conventional data communication networks have been complicated, redundant, and/or expensive. This is because the fault detection/restoration is carried out for open systems interconnection layers above the layer 3 per transit trunk and necessitated separate hardware and individual software for the hardware for each transit trunk.

In addition, attention should be directed to a problem as follows. When the X.25 protocols are used in the C manner for a duplicated communication network, a call from an X.5 communication terminal may be interrupted by an error in the sequence numbers and time out of the timer control to disable trial of retransmission of the call. Such an interruption takes place when the active series is switched to the standby series, when the faulty trunk is switched to a normal trunk, or when a next call is initiated to the alternative route.

In such an event, the LAPB LSI is used as above for the X.75 protocols. This necessitates LAPB LSI's individually for the normal trunks and for the alternative route or routes and renders the data communication network expensive.

SUMMARY OF THE INVENTION

It is consequently a general object of the present invention to provide a data communication network which comprises a plurality of exchange or switching stations and a plurality of transit trunks connecting each station to others of the exchange stations and is capable of selecting an alternative route in each station from the transit trunks with no interruption of a call when a fault takes place in the transit trunks.

It is a principal object of this invention to provide a routing system for use in each station of the data communication network of the type described.

It is another principal object of this invention to provide a routing system which is of the type described and which can select the alternative route to continue the call with no interruption through the alternative route.

It is still another principal object of this invention to provide a routing system which is of the type described and which is capable of restoring or recovering the fault to continue the call.

It is yet another principal object of this invention to provide a routing system which is of the type described and which is simple in hardware structure.

It is a further principal object of this invention to provide a routing system which is of the type described and which is operable with simple software.

It is a still further principal object of this invention to provide a routing system which is of the type described and in which no redundancy is necessary.

It is a yet further principal object of this invention to provide a routing system which is of the type described and which is inexpensive.

It is a subordinate object of this invention to provide a routing system which is of the type described and by which it is possible to suspend with no interruption the call originating at an X.25 communication terminal.

It is another subordinate object of this invention to provide a routing system which is of the type described and in which it is possible to use in each station at least one additional trunk control section and a plurality of additional terminal communication control sections.

Other objects of this invention will become clear as the description proceeds.

In accordance with this invention, there is provided a routing system which is for use in each station of first through N-th exchange stations of a data communication network in selecting an alternative route from a plurality of transit trunks connecting the above-mentioned each station to others of the exchange stations to send a call with no interruption through the alternative route, where N represents an integer of at least two, and which comprises a trunk control section comprising: (A) trunk terminator groups physically terminating the transit trunks to receive incoming signals and to send outgoing signals through the transit trunks; (B) a switch for switching the incoming signals into switch output signals and transmitted signals into the outgoing signals; (C) selecting means for conveying the switch output signals as conveyed signals and switch input signals as the transmitted signals and for selecting the alternative route; (D) frame relay communication control means for processing the conveyed signals into processed signals and controlled signals into the switch input signals in accordance with frame relay protocols; (E) frame relay procedure processing means for processing the processed signals into frame relay output signals and frame relay input signals into the controlled signals and for finding a fault sent through the transit trunks to locate a faulty trunk transmitting the fault, to produce a fault indication signal indicative of the faulty trunk during presence of the fault, to make the frame relay output signals carry the fault indication signal, to control the switch, and to make the selecting means select the alternative route in place of the faulty trunk during presence of the fault: (F) monitor and control means for executing layer 1 and layer 2 protocols on the faulty trunk for restoration of the fault while the switch is controlled: and (G) input-output means for processing the frame relay output signals into reception data signals and transmission data signals into the frame relay input signals.

The above-recited routing system may further comprise in the above-mentioned each station a terminal communication control section comprising: (A) a plurality of local terminators physically terminating local connections to receive output data signals and to send input data signals from and to X.25 terminals through the local connection; (B) X.25 communication control means for terminating X.25 protocols of the output and the input data signals and for processing the output data signals into means output signals and means input signals into the input data signals; and (C) X.25 procedure processing means for processing the means output signals into the transmission data signals and the reception data signals into the means input signals and for suspending processing of the means output signals during presence of the fault.

In the above-recited routing system, the trunk control section may be each of at least two trunk control sections, the terminal communication control section being each of a plurality of terminal communication control sections. Under the circumstances, it is possible to connect the input-output means additionally to at least one of the at least two trunk control sections besides the above-mentioned each trunk control section and to others of the terminal communication control sections besides the above-mentioned each terminal communication control section.

DESCRIPTION OF THE PREFERRED EMBODIMENT

Figure 1:
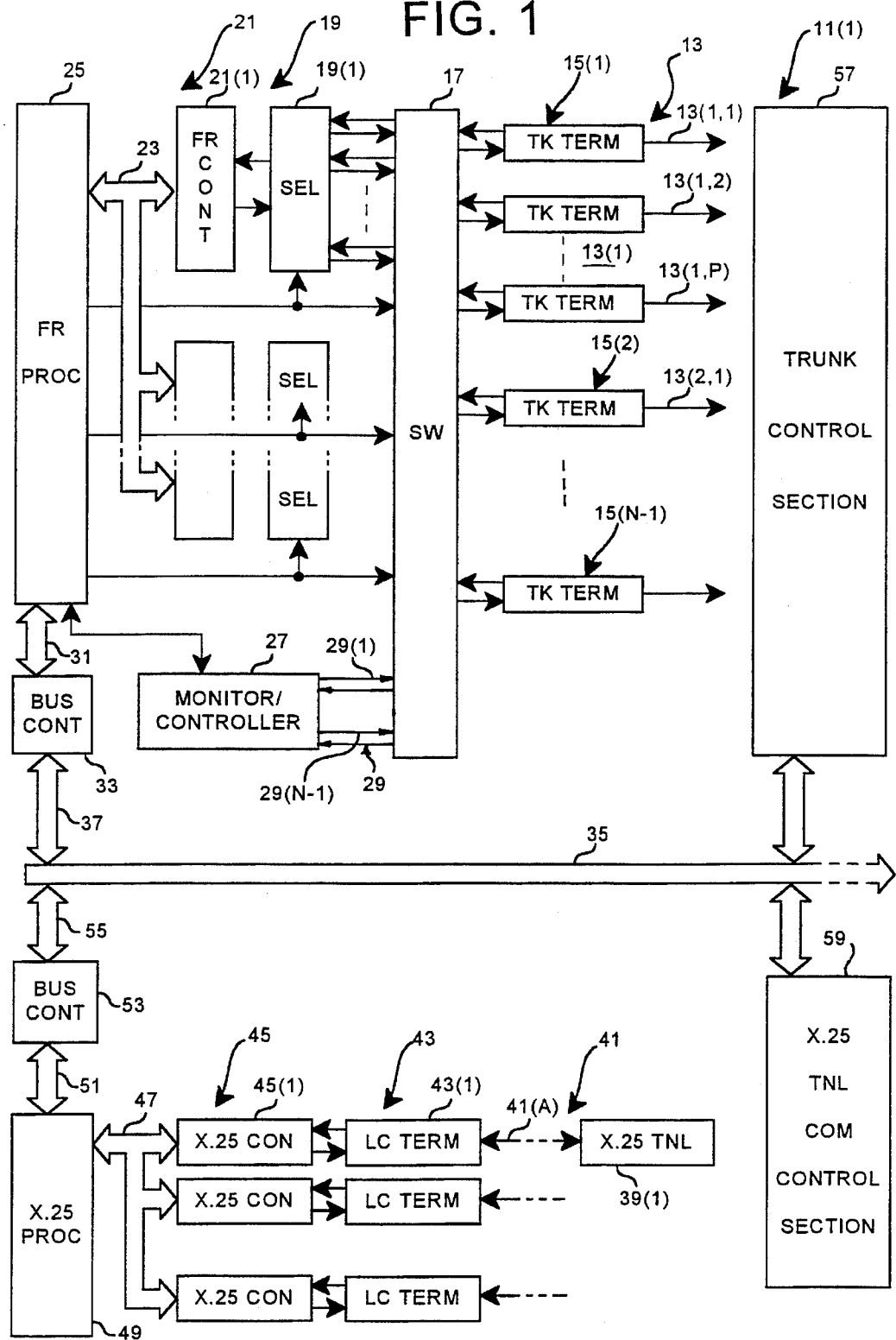
FIG. 1 is a block diagram of an exchange station used in a data communication network which comprises a routing system according to an embodiment of the instant invention.

Referring to FIG. 1, an exchange or switching station of a data communication network comprises a routing system according to a preferred embodiment of the present invention. The data communication network comprises first through N-th exchange offices, where N represents an integer which depends on a scale of the data communication network and is equal at least to two. It is possible to understand that each exchange office has a scale dependent on a local network of the data communication network and is illustrated in the figure as the exchange station at 11(1) which will be designated by a single reference numeral 11 with omission of the suffix enclosed with parentheses. Such manners of designation will be used throughout the description as regards circuit elements, signals, and so forth.

In FIG. 1, the exchange station 11 is connected to others of the exchange offices or stations, (N-1) in number, through first through (N-1)-th transit trunks 13(1) and so on or 13. These others of the exchange stations will alternatively be called counterpart stations. Each transit trunk 13 comprises a plurality P/of trunk channels. For example, the first transit trunk 13(1) comprises first primary through P-ary trunk channels 13(1, 1), 13(1, 2), ..., and 13(1, P). The number P depends on the counterpart station connected to the first transit trunk 13(1) and will be called a first natural number. Merely for simplicity of the description, each trunk channels of the transit trunks 13 will not always be strictly differentiated in naming from the transit trunks 13.

The exchange station 11 comprises trunk per station unit groups which are herein referred to as first through (N-1)-th trunk terminator groups (TK TERM) 15(1), 15(2), ..., and 15(N-1) or 15. Physically terminating the transit trunks 13, respecitvely, the trunk terminator groups 15 receive incoming signals and send outgoing signals from and to the counterpart stations through the transit trunks 13.

Connected to the trunk terminator groups 150 a switch (SW) 17 is supplied with the incoming signals through the terminator groups 15 and delivers the outgoing signals to the transit trunks 13 through the terminator groups 15. In the manner which will presently become clear, the switch 17 is controlled to switch the incoming signals into switch output signals and transmitted signals into the outgoing signals.

Connected to the switch 17, first through (N-1)-th route selectors (SEL) 19(1) and others or 19 are transparent to the switch output signals and to switch input signals supplied thereto. In other words, the route selectors 19 convey the switch output signals as conveyed signals and the switch input signals as the transmitted signals. In addition, the route selectors 19 are controlled like the switch 17. While controlled, each route selector 19 selects an alternative route from the transit trunks 13.

Connected to the route selectors 19, respectively, first through (N-1)-th frame relay communication controllers (FR CONT) 21(1) and so forth or 21 are for processing the conveyed signals into processed signals and controlled signals into the switch input signals. For this purpose, the frame relay communication controllers 21 comprise a large scale integration (LSI) chip in common. The chip will be called a frame relay LSI and is operable in accordance with frame relay protocols as will later be described.

Connected through a first bus 23 to the frame relay communication controllers 21, a frame relay procedure processor (FR PROC) 25 processes the processed signals into frame relay output signals and frame relay input signals into the controlled signals. Furthermore, the frame relay procedure processor 25 finds a fault in the incoming signals sent thereto as the processed signals to locate a faulty trunk which transmits the fault as by interruption of the incoming signal transmitted therethrough. Finding the fault or locating the faulty trunk, the frame relay procedure processor 25 produces a fault indication signal indicative of occurrence of the fault or of the faulty trunk and superposes the fault indication signal on the frame relay output signals. The fault indication signal is sent to the switch 17 and to the route selectors 19 to control the switch 17 and to have the alternative route selected by one of the route selectors 19 that is connected through the switch 17 and through a pertinent one of the trunk terminator groups 15 to the faulty trunk.

Through the switch 17, a monitor/controller 27 is related to the trunk terminator groups 15 by first through (N-1)-th switch connections 29(1) to 29(N-1) or 29 which are in one-to-one correspondence to the terminator groups 15. Furthermore, the monitor/controller 27 is directly connected to the frame relay procedure processor 25.

Controlled by the fault indication signal supplied from the frame relay procedure processor 25, the switch 17 actually connects the monitor/controller 27 to one of the trunk channels of the transit trunks 13 that is located as the faulty trunk. If one of the counterpart stations is wholly defective as a faulty station, the fault indication signal locates one of the transit trunks 13 as the faulty trunk that is connected to the faulty station. This fault indication signal actually connects the monitor/controller 27 to this faulty trunk.

Connected to the faulty trunk in this manner and controlled by the fault indication signal, the monitor/controller 27 executes open systems interconnection (OSI) layer 1 and layer 2 protocols on the faulty trunk or on the faulty station to restore or recover the fault and to deliver a fault restoration signal back to the frame relay procedure processor 25. The fault restoration signal stops production of the fault indication signal as soon as the fault is restored. The fault indication signal is consequently produced during presence of the fault.

Connected to the frame relay procedure processor 25 through a second bus 31, a first bus controller (BUS CONT) 33 is connected to a high-speed internal bus 35 through a third bus 37. In the manner which will shortly be described, the bus controller 33 processes the frame relay output signals into reception data signals for delivery to the internal bus 35 and, into the frame relay input signals, transmission data signals supplied through the internal bus 35. If produced, the fault indication signal is carried by the reception data signals.

In FIG. 1, an X.25 communication terminal (X.25 TNL) is depicted as a representative of first through Q-th X.25 communication terminals 39(1) and so forth or 39, where Q represents a second natural number. In the local network, the communication terminals 39 are situated here and there and are connected to first through Q-th local connections 41(1) and so on or 41.

The exchange station 11 comprises first through Q-th terminal per station units as first through Q-th local terminators (LC TERM) 43(1) and others or 43. Physically terminating the local connections 41, the local terminators 49 receive output data signals and deliver input data signals from and to the communication terminals 39 through the local connections 41.

Connected to the local terminators 43, respectively, first through Q-th X.25 communication controllers (X.25 45(1) and others or 45 terminate X.25 protocols used between each exchange station, such as 11, and the X.25 communication terminals 39. Into controller output signals, the X.25 communication controllers 45 process the output data signals supplied through the local terminators 43. The communication controllers 45 produce the input data signals in response to controller input signals for delivery to the local connections 41 through the local terminators 43. Like the frame relay communication controllers 21, the X.25 communication controllers 45 are preferably implemented by an LSI chip, which will be called a terminal connection LSI.

Through a fourth bus 47, an X.25 procedure processor (X.25 PROC) 49 is connected to the X.25 communication controllers 45. Processing the controller output signals, the X.25 procedure processor 49 produces processor output signals. Supplied with processor input signals, the X.25 procedure processor 49 produces the controller input signals. Related to the X.25 communication terminals 39, respectively, the processor input signals correspond to the controller output signals.

Through a fifth bus 51, the X.25 procedure processor 49 is connected to a second bus controller 53, which is connected in turn to the high-speed internal bus 35 through a sixth bus 55. Processing the processor output signals, the second bus controller 53 delivers the transmission data signals to the internal bus 35. Processing the reception data signals, the second bus controller 53 supplies the processor input signals to the X.25 procedure processor 49.

When carried by the reception data signals, the fault indication signal is superposed on one of the processor input signals that corresponds to a particular output signal of the controller output signals. In this event, the X.25 procedure processor 49 suspends processing of the particular output signal during presence of the fault And retransmits the particular output signal eventually as soon as one of the transmission data signals as soon as the fault is restored.

A minor combination of each trunk terminator group 15, the route selector 19, and the frame relay communication controller 21 serves as a trunk control part for each transit trunk 13 connected to a pertinent one of the counterpart stations. A major combination of first through (N-1)-th trunk control parts, the switch 17, the frame relay procedure processor 25, the monitor/controller 27, and the first bus controller 33 serves as a trunk control section.

Another major combination of the local terminators 43, the X.25 communication controllers 45, the X.25 procedure processor 49, and the second bus controller 53 serves as an X.25 terminal communication control section. It is possible to understand that a combination of the first and the second bus controllers 33 and 53 and the high-speed internal bus 35 as an input/output or trunk and terminal interfare device for processing the frame relay output signals into the reception data signals and the transmission data signals into the frame relay input signals. In such an event, it is furthermore possible to understand that the X.25 procedure processor 49 is supplied with the reception data signals as the processor input signals and produces the controller output signals as the transmission data signals for delivery to the input output device.

The first natural number P is usually less than the second natural number Q for whichever of the counterpart stations. If the trunk control section can not wholly accommodate the trunk channels of all counterpart stations, it is possible to additionally connect one or more similar trunk control sections to the high-speed internal bus 35 or the input/output device in the manner exemplified at 57. Likewise, it is possible to connect a plurality of additional X.25 ternanal communication (X.25 TNL COM) control sections to the internal bus 35 as indicated at 59. The routing system is therefore flexible and capable of coping with various changes in scale of the data communication network.

Figure 2:
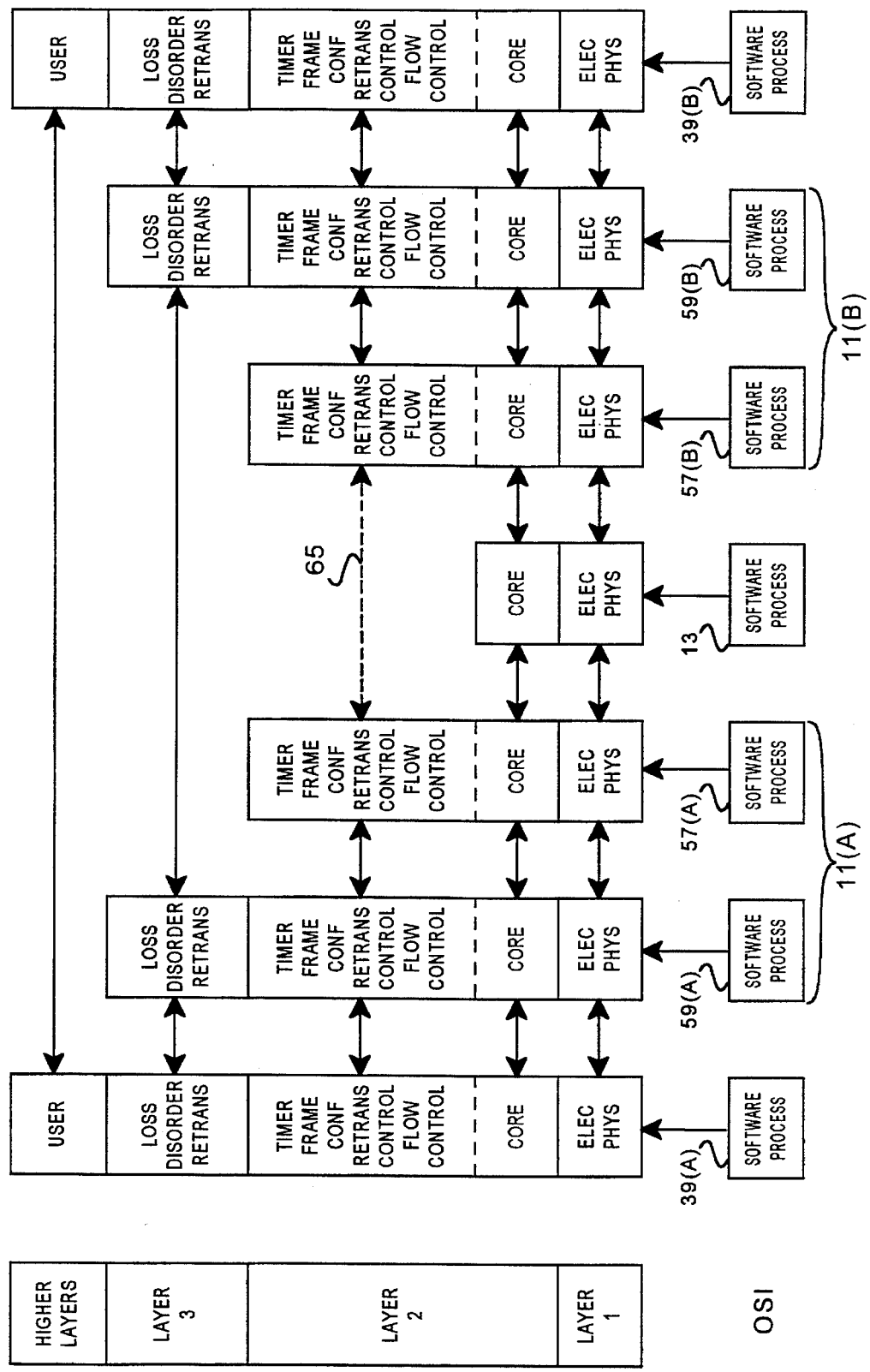
FIG. 2 shows flows of data signals in the data communication network mentioned in conjunction with FIG. 1.

Referring to FIG. 2 and continuously to FIG. 1, attention will be directed among the N exchange stations 11 to A and B stations 11(A) and 11(B) which are connected through one of the transit trunks 13 to each other. The open systems interconnection layers are indicated in a leftmost column labelled OSI as layers 1, layer 2, layer 3, and higher layers. As before, the suffixes A and B will often be omitted.

On processing call control data 61 and ordinary data 63 (both later illustrated) in the routing system being illustrated, software processing in only one of the X.25 communication terminals 39 for the A station 11(A) and one of the communication terminals 39 for the B station 11(B) will be taken into consideration and will be referred to as A and B terminals 39(A) and 39(B). For the trunk control sections 57 of the A and the B stations 11, software processings are called A and B trunk sections 57(A) and 57(B). For the X.25 terminal communication control sections 59 of the A and the B stations 11, software processings are called A and B terminal sections 59(A) and 59(B).

Between the A and the B terminals 39, a link is established by such software processings as follows. At each of the A and the B terminals 39, the A and the B terminal sections 59, the A and the B trunk sectional, and the transit trunk 13, the software processing is carried out in the layer 1 on electric and physical conditions as labelled ELEC and PHYS. In a lower core function sublayer of the layer 2, the software processing is applied to frame multiplexing/demultiplexing, zero-bit insertion/deletion, check of frame lengths, detection of transmission errors by a flag check sequence (ES), and so forth as indicated by CORE.

At each of the A and the B terminals 39, the A and the B terminal sections 59, and the A and the B trunk sections 57, the software processing proceeds in a higher sublayer of the layer 2 on a higher function, such as timer administration, confirmation of received information frames, retransmission control, and flow control, as labelled TIMER, FRAME CONF, RETRANS CONTROL, and FLOW CONTROL. For call processing alone in the higher sublayer of the layer 2, the link is established between the software processings at the A and the B trunk sections 57 as illustrated by a dashed line 65.

At each of the A and the B terminals 39 and the A and the B terminal sections 59, the software processing proceeds in the layer 3 on detection of loss of packets and of disorder in multiple logical channels, control of retransmission, and so on as labelled LOSS, DISORDER, and RETRANS. The software processings at the A and the B trunk sections 57 and at the transit trunk 13 are transparent for layer 3 protocols of the call and the ordinary data of the software processings at the A and the B terminals 39. Applications peculiar to the users are processed at the A and the B terminals 39 in the higher layers as labelled USER.

Figure 3:
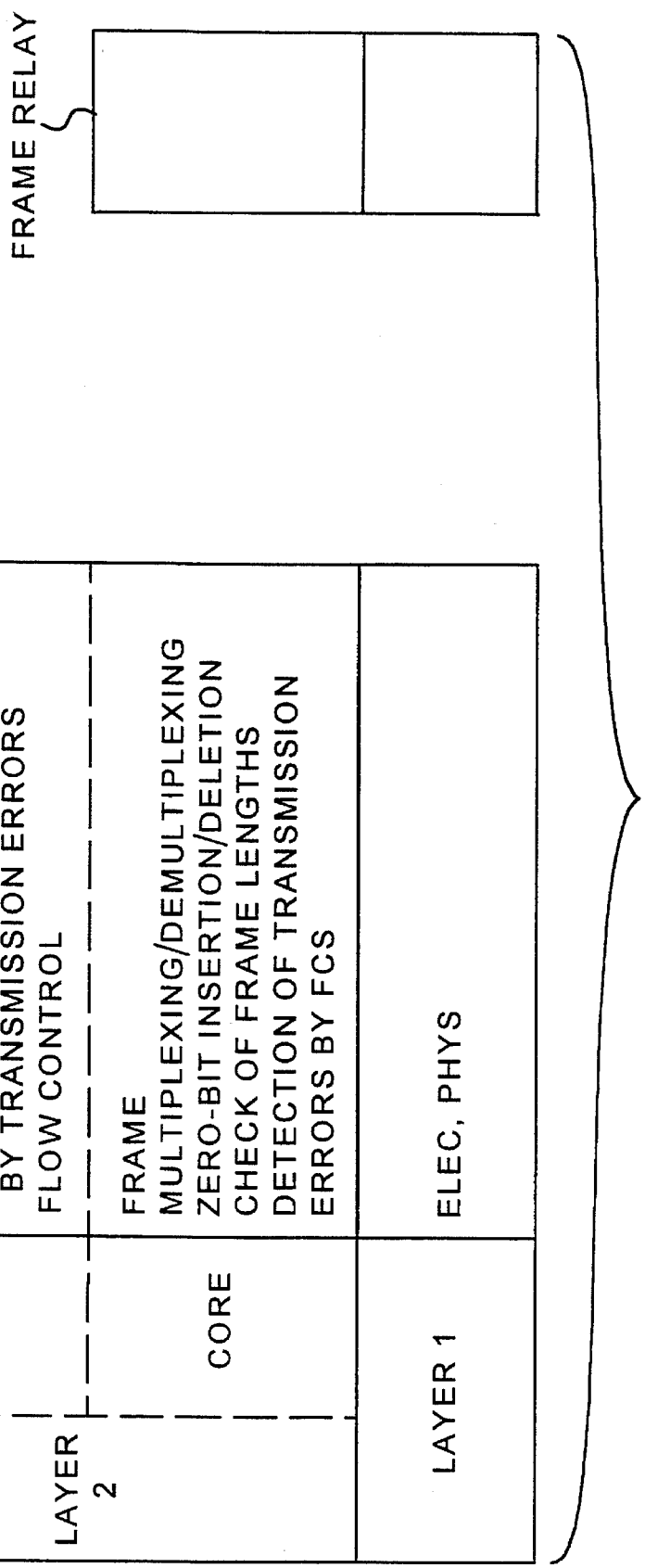
FIG. 3 shows functions of a known frame relay.

Turning to FIG. 3 during a short while with FIGS. 1 and 2 continuously referred to, function will be described of the frame relay used in the third manner described heretobefore in connection with fault detection/restoration. In FIG. 3, the function is depicted on the left side like in FIG. 2. The frame relay is illustrated on the right side by a thick-line rectangle with its function divided into the layers 1 and 2.

More specifically, the frame relay deals only with protocols of the layer I and of the core function of the layer 2. As for between each X.25 communication terminal 39 and the X.25 terminal communication control section 59 connected to the communication terminal 39 under consideration, the frame relay deals primarily with the core function, such as transmission error detection, by the flag check sequence.

The frame relay gives the communication control section 39 by charge of the higer sublayer of the layer 2 and of layers higher than the layer 2.

Figure 4:
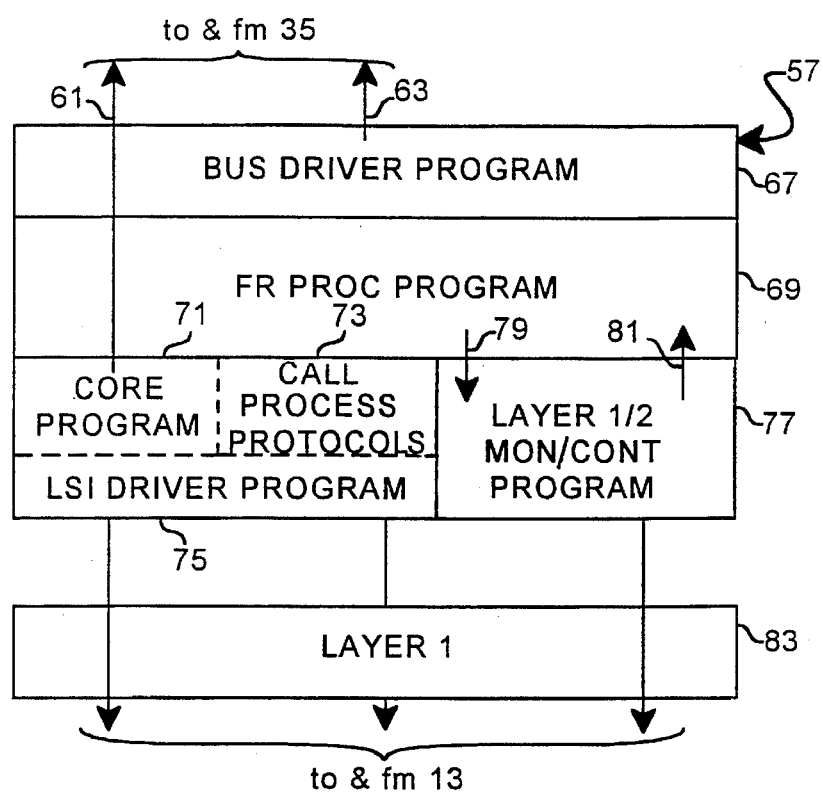
FIG. 4 shows functions of software which is used in a trunk control section of the exchange station illustrated in FIG. 1.

Referring afresh to FIG. 4 and again to FIGS. 1 and 2, the trunk control section 57 of each station 11 is controlled in general by software processings depicted at 57(A) and 57(B) as follows. More particularly, each of the A and the B trunk control sections 57 is controlled by protocols. Execution of the protocols is controlled by applications and operating systems (OS) of the layer 2 in the manner which will be described in the following.

The first bus controller 33 is controlled by a high-speed bus driver program 67 of processing the frame relay output signals into the reception data signals and the transmission data signals into the frame relay input signals. The frame relay procedure processor 25 is controlled by a frame relay procedure processing (FR PROC) program 69 of processing the processed signals into the frame relay output signals and the frame relay input signals into the controlled signals. In addition, the frame relay procedure processing program 69 makes the frame relay procedure processor 25 find the fault to produce the fault indication signal indicative of a faulty link as the faulty trunk, superpose the fault indication signal on the frame relay output signals, make the switch 17 connect the faulty trunk to the monitor/controller 27, and make the route selector 19 select the alternative route.

In the frame relay communication controller 21, the ordinary data 61 are controlled by a core program 71 for the core function described with reference to FIG. 2. The call control data 63 are controlled by call processing protocols 73 for the frame relay LSI to deal with the higher function described in conjunction with FIG. 2. The ordinary data 61 and the call control data 63 are controlled by an LSI driver program 75. The frame relay communication controller 21 thereby processes the conveyed signals into the processed signals and the controlled signals into the switch input signals.

The monitor/controller 27 is controlled by layer 1 and layer 2 monitor/control (MON/CONT) program 77. Put into operation by the fault indication signal in the manner indicated at 79, the monitor/control program 77 restores the fault. When the fault is restored, the monitor/control program 77 sends the fault restoration signal back to the frame relay procedure processing program 69 as indicated at 81.

In the manner described before, the route selector 19 is not controlled by the applications and the operating systems but is controlled by the failure indication signal to select the alternative route. In addition, the route selector 19 merely conveys or transmits the switch output signals as the conveyed signals and the switch input signals as the transmitted signals. The trunk terminator groups 15 are controlled by layer 1 protocols indicated at 83.

Figure 5:
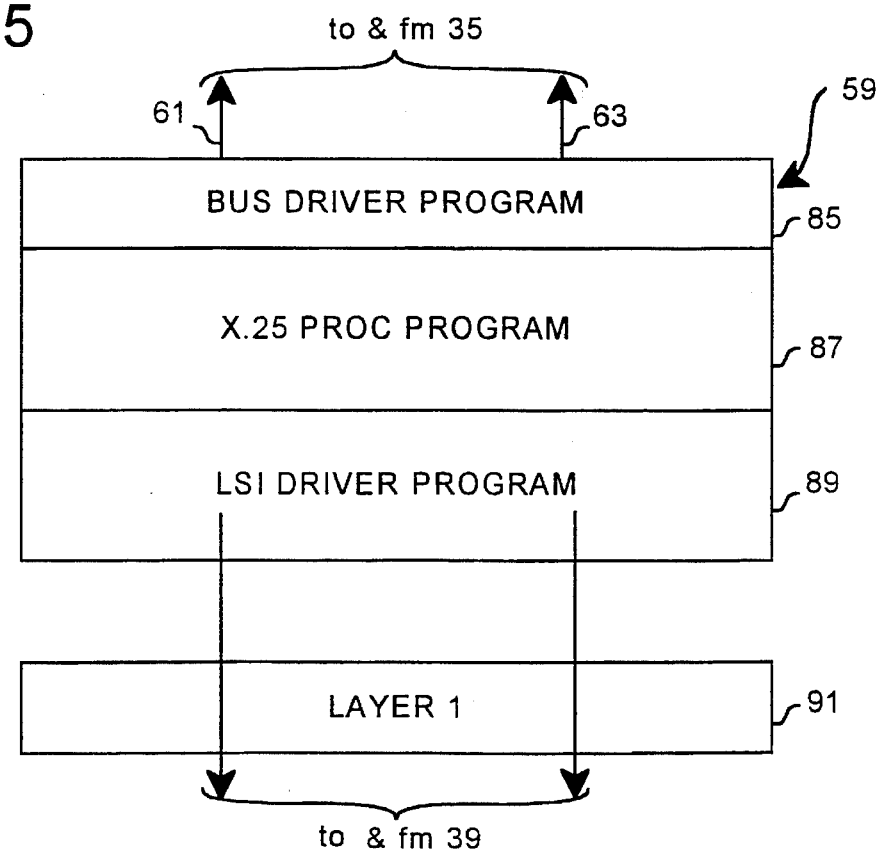
FIG. 5 shows functions of software which is used in an X.25 terminal communication control section of the exchange station depicted in FIG. 1.

Referring to FIG. 5 and additiionally to FIGS. 1 and 2, the X.25 terminal communication control section 59 of each station 11 is controlled generally by software processings depicted at 59(A) and 59(B) as follows. More specifically, each of the A and the B communication control sections 59 is controlled by protocols. Execution of these protocols is controlled by applications and operating systems of the layers 2 and 3 in the manner which will be described in the following.

The second bus controller 53 is controlled by a high-speed bus driver program 85 which is similar to the bus driver program 67 applied to the first bus controller 33. Taking those bus driver programs 67 and 85 together into consideration, it is possible to understand the input/output device (33, 35, 83) is controlled by an input/output program (67, 85) of processing the frame relay output signals into the reception data signals and the transmission data signals into the frame relay input signals with the fault indication signal superposed on the reception data signals.

The X.25 procedure processor 49 is controlled by an X.25 procedure processing (X.25 PROC) program 87 of terminating the layer 1 to layer 3 protocols. That is, the X.25 procedure processing program 87 processes the reception data signals into the processor input signals and the processor output signals into the transmission data signals or into the controller signals. Controlled by the fault indication signal carried by the reception data signals, the X.25 procedure processing program 87 transmits the controller output signals as the transmission data signals during absence of the fault indication signal. While the fault indication signal is active, the X.25 procedure processing program 87 suspends the controller output signals to retransmit the controller output signals as the transmission data signals as soon as the fault is recovered.

In each X.25 communication controller 45, the terminal controller LSI is controlled by an LSI driver program 89 of terminating the layer 2 protocols to process the controller input signals into the input data signals and the output data signals into the controller output signals. Each local terminator 43 is controlled by the layer 1 protocols 91 to deliver the input and the output data signals to and from the X.25 communication terminals 39 through the local connections 41.

Figure 6:
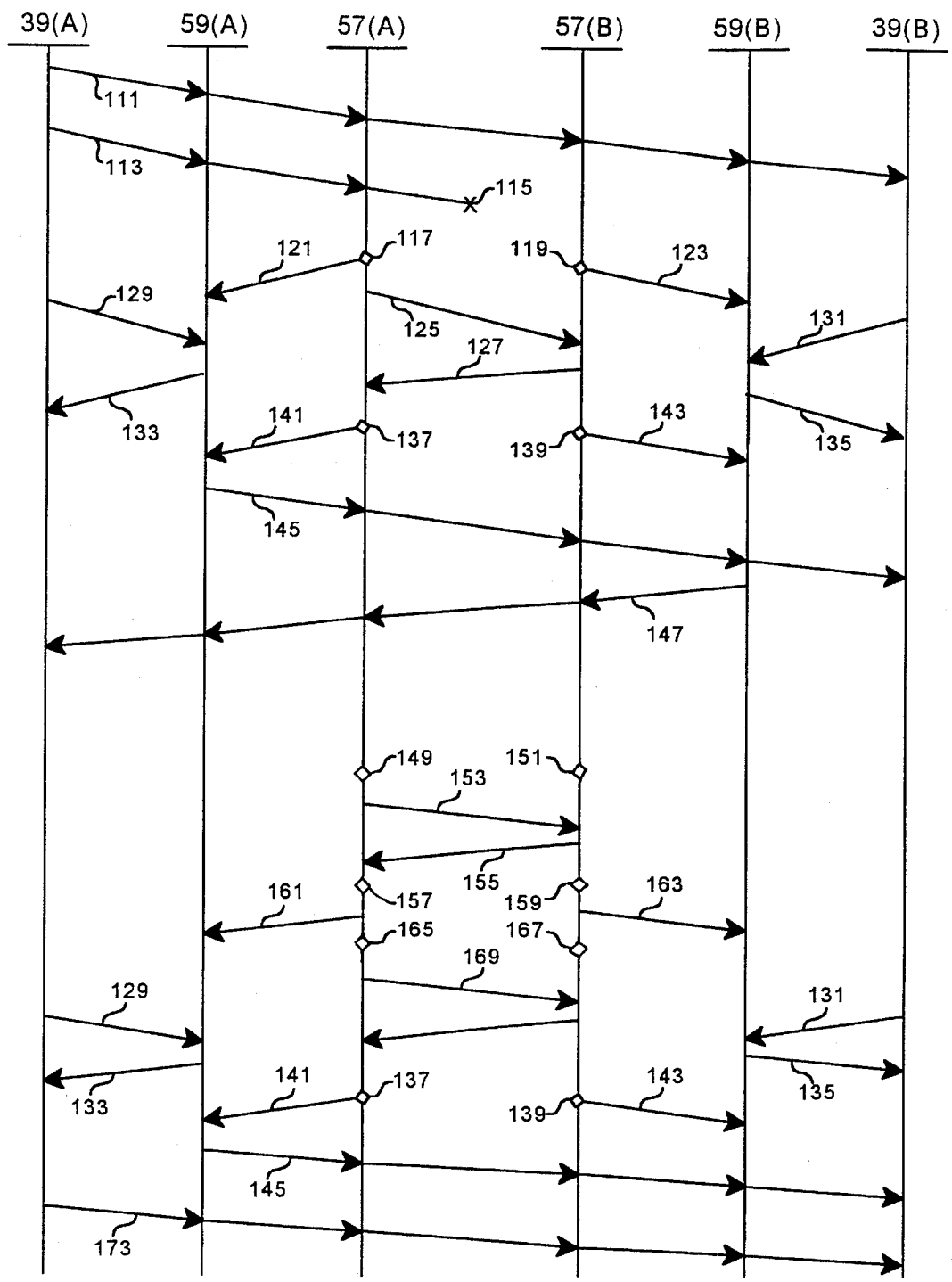
FIG. 6 schematically exemplifies operation of the routing system mentioned in connection with FIG. 1.

Referring now to FIG. 6 and again to FIGS. 1, 2, 4, and 5, the routing system is operable as follows on using the alternative route for a faulty channel and on switching the alternative route back to the trunk channel of which the fault is restored, and which serves again as a normal channel. In FIG. 6, time proceeds towards the bottom. Vertical lines indicate the software processings at the A and the B terminals 39 and others illustrated with reference to FIG. 2.

First, detection of the fault and retransmission of data will be described.

It will be assumed that data are successively sent from the A terminal 39(A) as the output data signals to the B terminal 39(B) as the input data signals in the manner illustrated at 111 and at 113 and that a fault takes place in one of the trunk channels 13 at 115 during delivery of the data indicated at 113. The A and the B trunk sections 57 detect the fault at 117 and 119 and send the fault indication signal to the A and the B terminal sections 59 at 121 and 123.

More particularly, it will be presumed that the fault is detected by the A trunk section 57(A). In this event, the fault results in a defect in the incoming signal received by the trunk terminator 15 in each of the A and the B stations 11 and in the switch output signal of the switch 17. Conveyed as a defect in the conveyed signal through the route selector 19 and in the frame relay output signal produced by the frame relay communication controller 21, the frame relay procedure processor 25 finds the fault, namely, the defect, by executing the frame relay procedure processing program 69 to deliver the fault indication signal to the switch 17, to the route selector 19, to the monitor/controller 27 as illustrated in FIG. 1 and at 79 in FIG. 4, and towards the X.25 procedure processor 49 as at 121 and 123.

Responsive to the fault indication signal, the route selector 19 selects the alternative route and sends a route switch signal through the alternative route to the B trunk section 57(B) as indicated at 125. In the B trunk section 57(B), the frame relay procedure processor 25 delivers a route switch response signal to the A trunk section 57(A) back through the alternative route at 127 in response to the route switch signal. Alternatively, it is possible to understand that the B trunk section 57(B) also finds the fault by incapability of receiving the incoming signal and produces another fault indication signal, which is sent to the A trunk section 57(A) through the alternative route as the route switch response signal at 127.

In the meantime, different data may be sent from the A and the B terminals 39 to the A and the B terminal sections 59 as output data signals in the manner illustrated at 129 and 131. Responsive to the fault indication signal supplied from the frame relay procedure processor 25 and to the output data signals supplied through the X.25 procedure processor 49 of each of the A and the B terminal sections 59, the X.25 procedure processor 49 suspends the controller output signal in accordance with the X.25 procedure processing program 87.

In the terminal section 59, each X.25 procedure processor 49 is controlled by the X.25 procedure processing program 67 to deliver a wait indication signal to the X.25 communication terminal 39 as indicated at 133 and 135. This prevents an instantaneous interruption in each output data signal and prevents data calls from being lost in the terminal sections 59.

In addition, the fault indication signal makes in each trunk section 57 the switch 17 connect the monitor/controller 27 to the faulty trunk. The monitor/controller 27 is activated and controlled by the layer 1 and the layer 2 monitor/control programs 77 to cope with the fault and to monitor the layer 1 and the layer 2 protocols on all transit trunks 13 in the manner which will presently be described more in detail.

Finding no faults in the transit trunks 13 at 137 and 139, each monitor/controller 27 sends the restoration indication signal to the frame relay procedure processor 25. Executing the frame relay procedure processing program 69, the frame relay procedure processor 49 indicates the restoration to the X.25 procedure processor 49 in each of the A and the B terminal sections 59 as indicated at 141 and 143.

Responsive to the restoration indication signal produced in the A trunk section 57(A), the X.25 procedure processor 49 retransmits the controller output signal to the B trunk section 57(B) and therefrom to the A terminal 39(A) as indicated at 145. At this instant, the X.25 procedure processor 49 is controlled by the X.25 procedure processing program 87 to check a skip or a disorder in the multiple sequences, namely, in packet data, by the software processing described in conjunction with FIG. 2 in the layer 3. Likewise, the X.25 procedure processor 49 in the B terminal section 59(B) retransmits the controller output signal to the B trunk section 57(B) and thence to the A terminal 39(A) at 147.

Next, attention will more particularly be directed to confirmation of the retransmission.

It is possible by the layer 1 and the layer 2 monitor/control programs 77 to monitor restoration of the fault in the layer i independently of the frame relay procedure processing program 69. This is indicated at 149 and 151 to indicate layer 1 restoration to the frame relay procedure processing program 69 as depicted at 81 in FIG. 4. The layer 1 and the layer 2 monitor/control programs 77 furthermore indicate call establishment at 153 and receives a call establishement response signal at 155 for establishment of a link up to the layer 2 and for restoration of the fault in the layer 2.

The monitor/controller 27 confirms by the layer 1 and the layer 2 monitor/control programs 77 restoration of the fault in the layer 2 in the transit trunk 13 at 157 and 159 and indicates the restoration to the frame relay procedure processing program 68 again at 81. Executing the frame relay procedure processing program 69, the frame relay procedure processor 25 delivers a route switch-back signal to the terminal section 59 at 161 and 163, to each route selector 69, and to each X.25 procedure processor 49. The route selector 19 switches the alternative route at 165 and 167 back to the normal channel. The frame relay procedure processing program 69 stops execution of the layer 1 and the layer 2 monitor/control programs 77.

When the alternative route is switched back, the route selector 19 of the A trunk section 57(A) transmits a call discontinuation signal at 169 to the B trunk section 57(B) in order to discontinue transmission of signals through the alternative route. In response, the B trunk section 57(B) sends a discontinuation response signal at 171 to the A trunk section 57(A).

Meanwhile, the output data signals may be sent from the A and the B terminals 39 in the manner described above at 129 and 131. The X.25 procedure processors 59 produce the wait indication signals as before at 133 and 135. In the manner described in the foregoing, no faults are found in the transit trunks 13 at 137 and 139. As soon as the restoration indication signal is produced at 141 and 143, the X.25 procedure processor 59 of the A terminal section 59(A) retransmits the controller output signal to the B terminal 39(B) at 145. The B terminal section 59(B) carries out retransmission described before. Consequently, it is possible to ordinarily transmit the output data signal from the A terminal 39(A) to the B terminal 39(B) in the manner exemplified at 173.

Reviewing FIGS. 1, 2, and 4 through 6, it should be noted that the monitor/controller 27 is connected to the faulty trunk or trunks by the switch 17 durirg presence of the fault. After the fault is found by the frame relay procedure processor 25, the minotor/controller 27 restores the fault and confirms restoration of the fault to make the frame relay procedure processor 25 control the route selector 19 for switch back of the alternative route to one of the transit trunks 13 in which the fault was found and is now restored. The frame relay communication controllers 21 are positioned with the route selectors 39 connected nearer to the transit trunks 13. As a consequence, it is possible to use the frame relay communication controlles 21, the frame relay procedure processor 25, and other circuit elements, such as the X.25 communication control section or sections 59, with no change both in hardware end software irrespective of presence or absence of the fault. This makes it possible to compose the frame relay communication controllers 21 by an LSI in common to both cases of presence and absence of the fault.

More particularly, it will be assumed that a fault takes place either in one of the trunk channels of the transit trunks 13 or in one of the transit trunks 13. In each trunk control section 57, the route selector 19 is controlled to connect the trunk control section 57 to the alternative route. Consequently, the switch 17 is controlled to connect the faulty trunk to the monitor/controller 27 to restore and monitor the fault. All transit trunks 13 are monitored in this manner by the monitor/controller 27. This makes it unnecessary to provide hardware individually for the trunk channels or for the transit trunks 13. The routing system is therefore rendered simple in structure and inexpensive. In addition, the frame relay communication controllers 21 are connected through intermediary circuit elements to the normal trunks and to the alternative route or routes. The frame relay LSI is therefore used both in the absence and in the presence of the fault. This makes it possible to render the routing system further inexpensive.

In each trunk control section 57, programs are used separately for the circuit elements, such as 21, 25, 27, and 33. It is, however, unnecessary to provide different software depending on the absence and the presence of the fault. This renders the routing system simple and inexpensive.

Again in each trunk control section 57, the frame relay procedure processing program 69 detects the fault. This detection of the fault is conveyed to the X.25 procedure processing program 87 to detect a loss in packed data and a disorder in multiple sequences and to control retransmission. It is consequently possible to prevent a call from being interrupted both when the fault is found and is restored.

In each X.25 terminal communication control section 59, the X.25 procedure processor 49 suspends the controller output signal during presence of the fault and to prevent a call of the X.25 communication terminals 39 from being interrepted by the fault.

It is possible to connect at least two trunk control sections 57 and a plurality of X.25 terminal communication control sections 39 to the input/output device. An occurrence of the fault can therefore control wait of individual data communications of the X.25 communication terminals 39.

While this invention has thus far been described in specific conjunction with a single preferred embodiment thereof, it will now be readily possible for one skilled in the art to carry this invention into effect in various other manners. For example, it is surmised in the foregoing that various programs are stored in the circuit elements concerned. It is possible to store the programs in a main memory (not shown) in common te such circuit elements.

What is claimed is:

1. A routing system for use in each station of first through N-th exchange stations of a data communication network in selecting an alternative route from a plurality of transit trunks connecting said each station to others of said exchange stations to send a call with no interruption through said alternative route, where N represents an integer which is equal at least to two, said routing system including a trunk control section comprising:

trunk terminator groups physically terminating said transit trunks to receive incoming signals and to send outgoing signals through said transit trunks;

a switch for switching said incoming signals into switch output signals and transmitted signals into said outgoing signals;

selecting means for conveying said switch output signals as conveyed signals and switch input signals as said transmitted signals and for selecting said alternative route;

frame relay communication control means for processing said conveyed signals into processed signals and controlled signals into said switch input signals in accordance with frame relay protocols;

frame relay procedure processing means for processing said processed signals into frame relay output signals and frame relay input signals into said controlled signals and for finding a fault sent through said transit trunks to locate a faulty trunk transmitting said fault, to produce a fault indication signal indicative of said faulty trunk during presence of said fault, to make said frame relay output signals carry said fault indication signal, to control said switch, and to make said selecting means select said alternative route in place of said faulty trunk during presence of said fault;

monitor and control means connected to said frame relay procedure processing means, said monitor and control means for executing layer 1 and layer 2 protocols on said faulty trunk for restoration of said fault while said switch is controlled; and input-output means for processing said frame relay output signals into reception data signals and transmission data signals into said frame relay input signals.

2. A routing system as claimed in claim 1, further comprising in said each station a terminal communication control section comprising in turn:

a plurality of local terminators physically terminating local connections to receive output data signals and to send input data signals from and to X.25 terminals through said local connections:

X.25 communication control means for terminating X.25 protocols of said output and said input data signals and for processing said output data signals into means output signals and means input signals into said input data signals; and X.25 procedure processing means for processing said means output signals into said transmission data signals and said reception data signals into said means input signals and for suspending processing of said means output signals during presence of said fault.

3. A routing system as claimed in claim 2, said trunk control section being each of at least two trunk control sections, said terminal communication control section being each of a plurality of terminal communication control sections, wherein said input-output means is additionally connected to at least one of said at least two trunk control sections besides said each of at least two trunk control sections and to others of said terminal communication control sections besides said each of terminal communication control sections.

4. A routing system as claimed in claim 2, wherein:

said X.25 communication control means is controlled by an LSI driver program of driving an LSI of said X.25 communication control means;

said X.25 procedure processing means being controlled by an X.25 procedure processing program of processing said reception data signals into said means input signals and of processing said means output signals into said transmission data signals for transmission to said input-output means during absence of said fault and for retransmission to said input-output means upon restoration of said fault with correction made for achievement of no interruption of said call on a loss and a disorder which are introduced into said means output signals during presence of said fault.

5. A routing system as claimed in claim 4, wherein said X.25 procedure processing program processes said means output signals into said transmission data signals for transmission to said input-output means during absence of said fault and suspends processing of said means output signals into said transmission data signals during presence of said fault to restart processing of said means output signals into said transmission data signals for transmission to said input-output means with said correction made upon restoration of said fault.

6. A routing system as claimed in claim 2, said X.25 communication control means being composed of an LSI, wherein said LSI is driven by an LBS driver program both during presence and absence of said fault.

7. A routing system as claimed in claim 6, wherein said X.25 procedure processing means in controlled by an X.25 procedure processing program of processing said reception data signals into said means input signals, of processing said means output signals into said transmission data signals for transmission to said input-output means during absence of said fault, and of suspending processing of said means output signals into said transmission data signals during presence of said fault to restart processing of said means output signals into said transmission data signals for transmission to said input-output means upon restoration of said fault with corrections made for achievement of no interruption of said call on a loss and a disorder which are introduced into said means output signals during presence of said fault.

8. A routing system as claimed in claim 1, wherein:
said frame relay communication control means is controlled by an LSI driver program of driving an LSI of said frame relay communication control means and, in accordance with said frame relay protocol, by a core program of controlling communication data of said conveyed and said controlled signals and by a call processing program of controlling said control data of said conveyed and said controlled signals said frame relay procedure processing means being controlled by a frame relay procedure processing program of finding said fault in said processed signals to produce said fault indication signal until restoration of said fault and of making said switch connect said faulty trunk to said monitor and control means and said selecting means select said alternative route during presence of said fault;

said monitor and control means being controlled by a monitor and control program of processing the layer 1 protocol for control signals and the layer 2 protocol for flag synchronism on said faulty trunk to carry out monitor and restoration of said fault;

said input-output means being controlled by an input-output driver program of processing said frame relay output signals into said reception data signals and said transmission data signals into said frame relay input signals.

9. A routing system as claimed in claim 1, said frame relay communication control means being composed of an LSI, wherein said LSI is driven by an LSI driver program of processing said conveyed signals into said processed signals and said controlled signals into said switch input signals both during presence and absence of said fault.

10. A routing system as claimed in claim 9, wherein:
said frame relay procedure processing means is controlled by a frame relay procedure processing program of processing said processed signals into said frame relay Output signals and said frame relay input signals into said controlled signals and of finding said fault in said processed signals to locate said faulty trunk, to produce said fault indication signal, to make said frame relay output signals carry said fault indication signal, to control said switch, and to make said selecting means select said alternative route;

said monitor and control means being controlled by layer 1 and layer 2 monitor-control programs of executing said layer 1 and layer 2 protocols on said faulty trunk:

said input-output means being controlled by an input-output driver program of processing said frame relay output signals into said reception data signals and said transmission data signals into said frame relay input signals.

* * * * *